(12) United States Patent
Johnson et al.

(10) Patent No.: US 6,440,026 B1
(45) Date of Patent: Aug. 27, 2002

(54) HYDRO-MECHANICAL TRANSMISSION

(75) Inventors: Douglas Rene Johnson; Craig Alan Puetz, both of Waterloo, IA (US); Ulrich Otten, Speyer (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/669,987

(22) Filed: Sep. 26, 2000

(51) Int. Cl.$^7$ .............................................. F16H 47/04
(52) U.S. Cl. ...................................................... 475/81
(58) Field of Search .................... 475/81, 82

(56) References Cited

U.S. PATENT DOCUMENTS

| | | | |
|---|---|---|---|
| 3,990,327 A | 11/1976 | Margolin | 74/687 |
| 4,116,089 A | * 9/1978 | Orshansky, Jr. | 74/687 |
| 4,134,311 A | * 1/1979 | Orshansky, Jr. | 74/687 |
| 4,286,477 A | 9/1981 | Meyerle et al. | 74/687 |
| 4,304,151 A | 12/1981 | Meyerle et al. | 74/687 |
| 4,306,467 A | 12/1981 | Pollman | 74/687 |
| 4,341,131 A | 7/1982 | Pollman | 74/687 |
| 4,382,392 A | 5/1983 | Meyerle et al. | 74/687 |
| 4,429,593 A | 2/1984 | Michael | 74/687 |
| 4,754,664 A | 7/1988 | Dick | 74/687 |
| 5,667,452 A | 9/1997 | Coutant | 475/81 |
| 5,695,422 A | 12/1997 | Otten | 475/72 |
| 5,730,678 A | 3/1998 | Larkin | 475/81 |
| 5,830,097 A | 11/1998 | Larkin | 475/72 |
| 5,868,640 A | 2/1999 | Coutant | 475/72 |
| 5,890,981 A | 4/1999 | Coutant et al. | 475/72 |
| 5,931,758 A | 8/1999 | Walter | 475/72 |
| 5,946,983 A | 9/1999 | Brambilla | 74/730.1 |
| 6,042,496 A | 3/2000 | Lehle et al. | 475/81 |
| 6,056,657 A | 5/2000 | Garnett | 475/72 |

FOREIGN PATENT DOCUMENTS

| | | |
|---|---|---|
| DE | 198 43 069 | 9/1998 |
| GB | 2 011 560 | 7/1979 |

* cited by examiner

Primary Examiner—Dirk Wright

(57) ABSTRACT

A hydro-mechanical transmission having a planetary system with three planetary gear sets including a reversing planetary gear set together with two clutches and a reverse brake to provide an infinitely adjustable speed change over the speed range from –20 kph to 60 kph without an additional direction change gear set. The transmission has two forward speed ranges and one reverse speed range. The planetary system has fixed mechanical and hydrostatic power input elements and a fixed output element. The low and high range clutches and the reverse brake direct power flow through the transmission along different paths to produce the different gear ratios. Transmission efficiency is maximized at the field use speed and the transport road speed where an agricultural tractor is most often operated.

19 Claims, 2 Drawing Sheets

HYDRO-MECHANICAL TRANSMISSION

BACKGROUND OF THE INVENTION

1. Field of the Invention

The present invention relates to a hydro-mechanical transmission having both mechanical and hydrostatic power branches and in particular to such a transmission for use in an agricultural tractor.

2. Description of Related Art

Hydro-mechanical transmissions are transmissions that combine a mechanical transmission with a hydrostatic unit. Although mechanical transmissions are generally more efficient and reliable than pure hydrostatic transmissions, they have the disadvantage of not being infinitely variable, as are the more expensive hydrostatic transmissions. Likewise, the hydrostatic transmissions have a major disadvantage in that they are less efficient then mechanical transmissions. Hydrostatic transmissions also generally require larger components, such as larger pumps and motors, as the transmission increases in capacity.

In order to satisfy space limitations, reduce cost, increase efficiency and provide an infinitely variable speed, hydro-mechanical transmissions have been developed that combine the best features of both transmissions. Hydro-mechanical transmissions are typically of a split power input type, where a hydrostatic unit and a mechanical transmission are driven in parallel by the vehicle engine. The hydrostatic output power is combined in the mechanical transmission with the split mechanical power input from the engine to produce hydro-mechanical output power in multiple power ranges. In each range, varying the stroke of the hydrostatic unit can infinitely vary the speed and torque.

While hydro-mechanical transmissions are known in the art, most transmissions suffer from high complexity. Many hydro-mechanical transmissions also require additional gear sets to provide a reverse range.

SUMMARY OF THE INVENTION

It is an object of the present invention to provide a hydro-mechanical transmission that is uniquely designed for optimal operation in an agricultural tractor. An agricultural tractor is most often operated in the field at a field use speed or on the road at a transport speed. The field use speed is in the range of 7–12 kph while the transport speed is in the range of 36–60 kph. It is thus desirable to provide a transmission that has its peak efficiencies at these two most commonly used speeds. A hydro-mechanical transmission typically has an efficiency peak in each transmission shift range at the speed where the hydrostatic unit output is near or at zero. At these points, the transmission is operating most like a mechanical transmission and at the higher efficiency of a mechanical transmission.

Hydro-mechanical transmissions typically have one or more shift points where the transmission shifts from one range to another. It is a further objective of the present invention to configure the transmission such that the shift point or points occur outside of the field use speed or the transport speed to minimize shift occurrence. By placing a single shift point between the field use speed and the transport speed, the shift point is only encountered when the tractor is accelerating or decelerating through the shift point. It is unlikely that the tractor will be operated continuously at or near the shift point speed.

It is a further advantage of the present invention to provide a transmission having a physical package similar to existing mechanical transmissions in length, enabling it to be readily integrated into existing tractor designs with minimal modification to the tractor. Many prior hydro-mechanical transmissions do not integrate a reverse gear set into the combining mechanical transmission but instead have a separate gear set before or after the combining mechanical transmission for shifting between forward and reverse directions. Such a design takes more space and may require the vehicle be brought to a stop before shifting between forward and reverse.

It is a still further objective of the present invention to provide a transmission in which the speed can be commanded anywhere in the full speed range of approximately −20 kph to 60 kph without requiring the operator to perform a shift when the vehicle transitions from a reverse direction to a forward direction and vice versa.

The hydro-mechanical transmission of the present invention achieves high efficiency in the field use and transport speeds by selecting the gear ratios to achieve pure mechanical drive at the field use and transport speeds. The gear ratios are selected so that there is no or little hydrostatic power being transferred at these speeds.

The placement of the shift modes outside of the two most common operating speeds is accomplished by providing the transmission with two forward speed ranges, a low speed range and a high speed range, with a single shift point between the two ranges. This coordinates well with the desire for two points of maximum efficiency. The shift point occurs when the variable displacement portion of the hydrostatic unit is at the maximum stroke angle. This corresponds with the point of least efficiency. By locating the point of least efficiency of the transmission at an intermediate point between the field use speed and the transport speed, the amount of time the vehicle is operated at the least efficient speed is minimized. Thus, the transmission efficiency is optimized for the intended agricultural tractor duty cycle.

Another benefit of a transmission having only two forward speed ranges and a single shift point therebetween is that the transmission efficiency curve is flatter at the field use speed and the transport speed. This provides increased flexibility in the speed selection in the field and on the road while still maintaining a relatively high efficiency. This is in contrast to transmissions having three or more shift ranges and shift points where the region of maximum efficiency is in a narrower band between each shift point.

The hydro-mechanical transmission has a planetary system including three planetary gear sets including a reversing planetary gear set together with two clutches and a reverse brake to provide an infinitely adjustable speed change over the speed range from −20 kph to 60 kph without an additional direction change gear set.

The compact package size of the transmission is facilitated by a number of features in the transmission. The hydraulic pump and motor are both located in the same general location along the axis of the transmission, thus minimizing the axial length of the transmission required for the pump and motor. To further reduce the size of the transmission, many components in the transmission are utilized for multiple functions to minimize the number of clutches and other components in the transmission. For example, the combining mechanical transmission uses the sun gear S1 as the fixed mechanical power input during all modes of operation. Likewise, the planetary ring gear 2 is the hydrostatic power input for all operating modes. A single output member is also used in all operating modes. Two clutches are provided, a low range clutch, a high range clutch, and a single reverse brake. In the low range mode, the planet gear carrier is coupled to the output by the low range clutch. In the high range mode, a sun gear S2 is coupled to the output by the high range clutch. In reverse, a reverse brake is engaged to ground a ring gear R3. This drives the output, a sun gear S3 in the reverse direction.

DESCRIPTION OF THE PREFERRED EMBODIMENT

Figure 1:
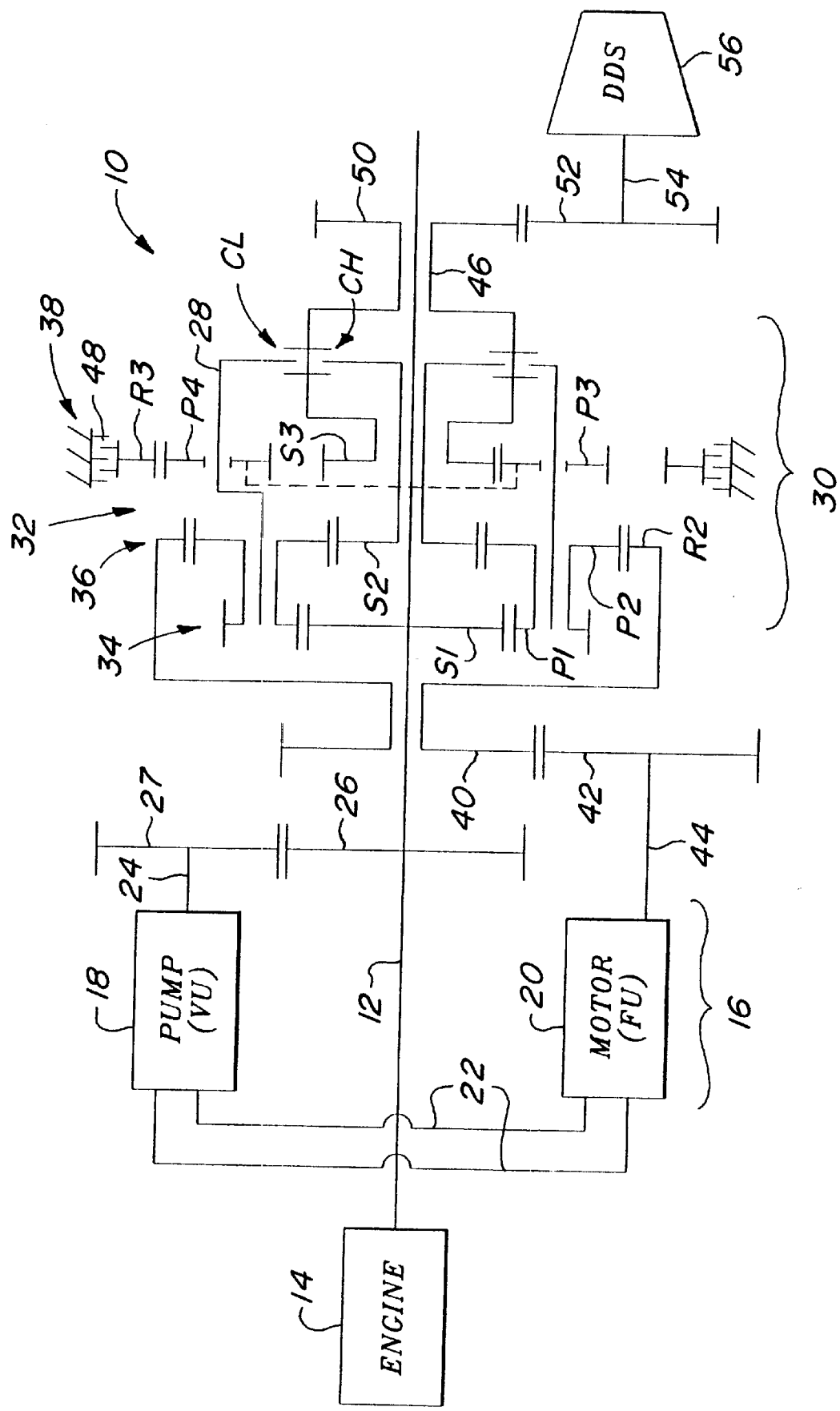
FIG. 1 is a schematic representation of the th[0085] mechanical transmission of the present invention.

The hydro-mechanical transmission of the present invention is shown schematically in FIG. 1 and designated generally at 10. The transmission 10 has an input shaft 12 adapted to be coupled to and driven by an engine 14 or other source of rotational power. The transmission has a hydrostatic unit 16 including a variable displacement pump 18 and a fixed displacement motor 20. The pump and motor are coupled hydraulically as shown by the lines 22 to form a hydrostatic transmission. Those skilled in the art will recognize that both the pump and the motor may be variable displacement components. The pump has an input shaft 24 that is driven by the transmission input shaft 12 through a pair of gears 26 and 27.

The transmission includes a combining mechanical transmission 30 having planetary system 32. The planetary system 32 includes three planetary gear sets 34, 36, and 38. The planetary gear sets have a common planet gear carrier 28 that carries the integral planet gears P1 and P2 of planetary gear sets 34 and 36 respectively. The carrier 28 also carries the planet gears P3 and P4 of the reversing planetary gear set 38. The planet gears P1 and P2 are integrally formed and thus rotate together. The planet gears P2 mesh with a ring gear R2. The ring gear R2 is formed integrally with a gear 40, coaxial with the transmission input shaft 12. The gear 40 is driven by the drive gear 42 on a hydrostatic unit output shaft 44. Thus the ring gear R2 serves as a hydrostatic power input element.

The transmission input shaft 14 also drives a sun gear S1 of the first planetary gear set 34 whereby the sun gear S1 is the mechanical power input element. Sun gear S1 meshes with the planet gear P1. The planetary gear set 36 includes a sun gear S2 meshing with the planet gears P2.

Two clutches, a low range clutch CL and a high range clutch CH, selectively couple elements of the planetary system to the mechanical transmission output shaft 46. The shaft 46 is a sleeve shaft that surrounds the input shaft 12 that extends through the entire transmission to drive a power take off, not shown, and/or to drive other vehicle components, such as a hydraulic pump, in a known manner for an agricultural tractor. The low range clutch CL is engagable to couple the carrier 28 to the output shaft 46 for a low speed forward range. The high range clutch CH is engagable to couple the sun gear S2 to the output shaft 46 for a high speed forward range.

The output shaft 46 is fixed to the sun gear S3. Ring R3 is selectively grounded by the reverse brake 48. This stops the rotation of the ring gear R3 and causes the sun gear S3 to rotate in the reverse direction for a reverse speed range. When the reverse brake 48 is applied, both the low and high range clutches CL and CH are disengaged, whereby the sun gear S3 drives the output shaft 46.

The output shaft 46 of the mechanical transmission is integrally formed with a gear 50 that in turn meshes with a gear 52 on the offset shaft 54. The offset shaft is coupled to the differential drive shaft 56 of the tractor to couple the hydro-mechanical transmission 10 to a load.

The transmission 10 operates in three ranges, a reverse range, a low speed forward range and a high speed forward range. Each range uses a separate path through the mechanical transmission to the output shaft 46 resulting in unique gear ratios for each range.

Figure 2:
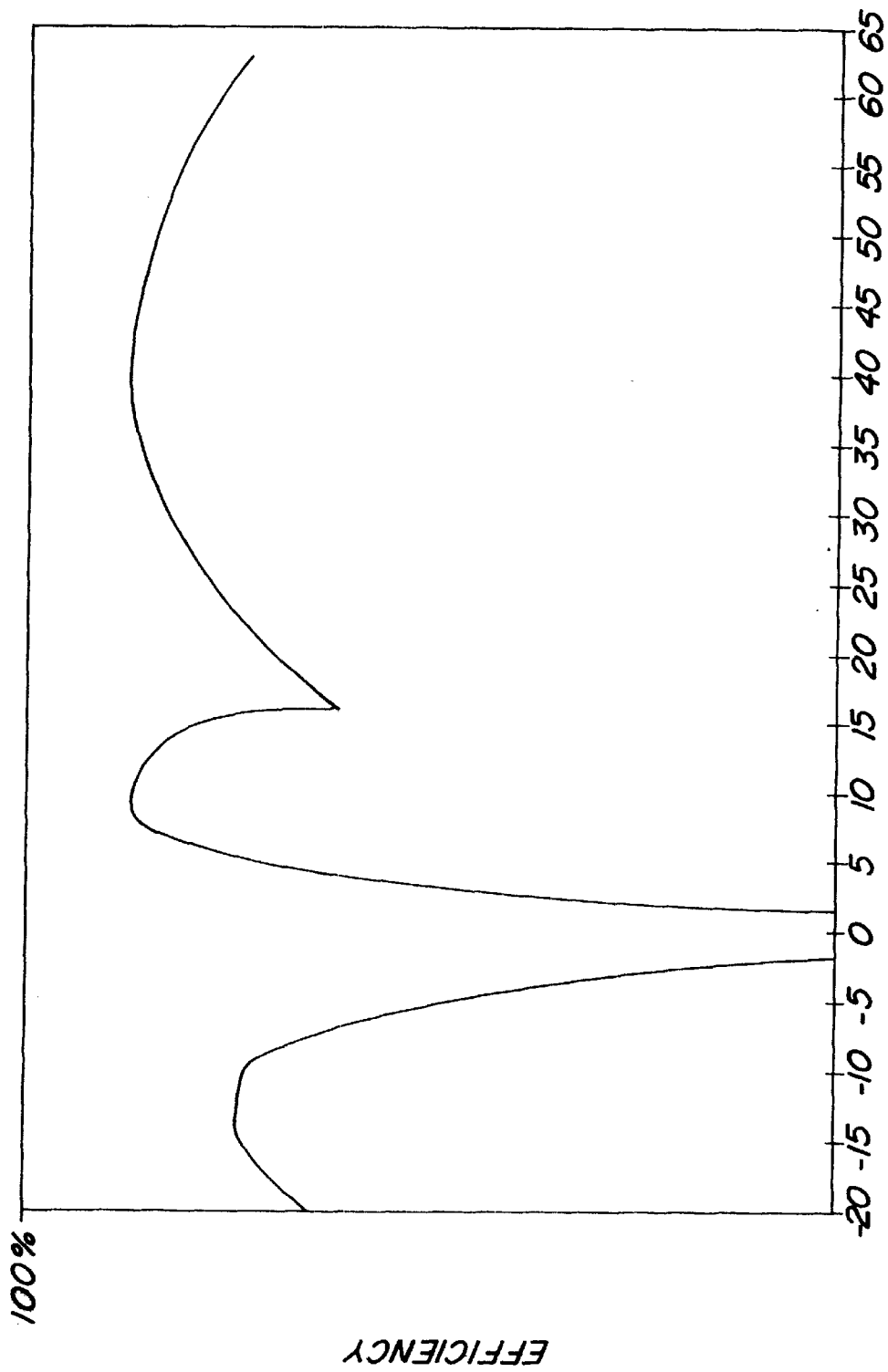
FIG. 2 is a graph of the transmission efficiency versus vehicle speed.

The transmission efficiency is shown in FIG. 2. The low forward speed range has a peak efficiency at the field use speed range of 7–12 kph while the high forward speed range has a peak efficiency near the transport speed range of 40–45 kph.

The invention should not be limited to the above-described embodiment, but should be limited solely by the claims that follow.

We claim:

1. A hydro-mechanical transmission comprising:
    an input shaft adapted to be connected to a rotational power source;
    an output shaft adapted to be connected to a load;
    a hydrostatic unit driven by the input shaft and having an output;
    a mechanical transmission having a planetary gear system including:
        a first element coupled to the hydrostatic unit output and driven thereby;
        a second element coupled to the input shaft and driven thereby;
        a third element selectively coupled to the output shaft through a low range clutch;
        a fourth element selectively coupled to the output shaft through a high range clutch;
        a fifth element coupled to the output shaft; and
        a sixth element selectively coupled to ground by a reverse brake wherein the fifth element and the output shaft are driven in reverse.

2. The hydro-mechanical transmission as defined by claim 1 wherein the planetary system has three planetary gear sets.

3. The hydro-mechanical transmission as defined by claim 2 wherein first and second planetary gear sets have planet gears (P1) and (P2) respectively which are fixed to one another and thereby rotate together.

4. The hydro-mechanical transmission as defined by claim 2 wherein the three planetary gear sets have a common planet gear carrier.

5. The hydro-mechanical transmission as defined by claim 4 wherein the planet gear carrier is the third element that is selectively coupled to the output shaft through the low range clutch.

6. The hydro-mechanical transmission as defined by claim 4 wherein the three planetary gear sets include planet gears (P1) meshing with a sun gear (S1), planet gears (P2) meshing with a sun gear (S2) and a ring gear (R2) and wherein the planet gears (P1) and (P2) are fixed to one another and thereby rotate at the same speed.

7. The hydro-mechanical transmission as defined by claim 6 wherein the sun gear (S1) is the second element and the ring gear (R2) is the first element.

8. The hydro-mechanical transmission as defined by claim 6 wherein a sun gear (S3) is the fifth element and is fixed to the output shaft.

9. The hydro-mechanical transmission as defined by claim 8 wherein a ring gear (R3) is the sixth element.

10. A hydro-mechanical transmission comprising:

an input shaft adapted to be connected to a rotational power source;

an output shaft adapted to be connected to a load;

a hydrostatic unit driven by the input shaft and having an output;

a mechanical transmission having a planetary gear system including first and second planetary gear sets including a pair of sun gears (S1) and (S2), a ring gear (R2), the sun gear (S1) being driven by the input shaft, the ring gear (R2) being driven by the hydrostatic unit output while the carrier is selectively coupled to the output shaft through a low range clutch and the sun gear (S2) is selectively coupled to the output shaft through a high range clutch to provide two forward speed ranges.

11. The hydro-mechanical transmission as defined by claim 10 wherein the first and second planetary gear sets have planet gears (P1) and (P2) that are fixed to one another.

12. The hydro-mechanical transmission as defined by claim 10 further comprising a reversing third planetary gear set having a sun gear (S3) and a ring gear (R3), the sun gear (S3) being fixed to the output shaft and the carrier is coupled to the sun gear (S3) via the low range clutch and the sun gear (S2) is coupled to the sun gear (S3) via the high range clutch; and a reverse brake to selectively ground the ring gear (R3) to drive the sun gear (S3) in a reverse direction with the high and low range clutches disengaged whereby the transmission provides a reverse direction drive.

13. The hydro-mechanical transmission as defined by claim 12 wherein the reversing third planetary gear set has planet gears (P3) and (P4) and further comprising a common planet gear carrier to which the planet gears (P1, P2, P3 and P4) are all carried.

14. A hydro-mechanical transmission comprising:

an input shaft adapted to be connected to a rotational power source;

an output shaft adapted to be connected to a load;

a hydrostatic unit driven by the input shaft and having an output;

a mechanical transmission having a planetary gear system, the mechanical transmission having a pair of input elements with one input element coupled to the hydrostatic unit output to be driven thereby and one input element coupled to the input shaft and continuously driven thereby, the mechanical transmission combining the two inputs into a single hydro-mechanical power output, the mechanical transmission having a planetary system with three planetary gear sets including a reversing planetary gear set, a low range clutch, a high range clutch and a reverse brake whereby the transmission has two forward speed ranges and one reverse speed range for infinitely variable speed adjustment between a full speed reverse and a full speed forward.

15. The hydro-mechanical transmission as defined by claim 14 wherein first and second planetary gears sets of the three planetary gear sets have planet gears (P1) and (P2) fixed to one another.

16. The hydro-mechanical transmission as defined by claim 14 wherein the three planetary gear sets have a common planetary gear carrier.

17. The hydro-mechanical transmission as defined by claim 14 wherein the three planetary gear sets include sun gears (S1, S2) and (S3), ring gears (R2) and (R3) and planet gears (P1) meshing with sun gear (S1), planet gears (P2) meshing with sun gear (S2) and ring gear (R2), planet gears (P3) meshing with sun gear (S3) and planet gears (P4) meshing with ring gear (R3) and planet gears (P3).

18. The hydro-mechanical transmission as defined by claim 17 wherein the carrier is selectively coupled to the transmission output by the low range clutch for a low forward speed range and the sun gear (S2) is couple to the transmission by the high range clutch for a high forward speed range with the low range clutch being disengaged and the high range clutch being engaged to shift from the low forward speed range to the high forward speed range as the speed increases from the low forward speed range to the high forward speed range.

19. The hydro-mechanical transmission as defined by claim 14 wherein the low and high range clutches produce low and high forward operating speed ranges wherein the transmission has a peak efficiency within each range whereby the transmission can be adapted for use in an agricultural tractor having two primary operating speeds matched to the two efficiency peaks of the transmission.

\* \* \* \* \*

UNITED STATES PATENT AND TRADEMARK OFFICE
CERTIFICATE OF CORRECTION

PATENT NO.    : 6,440,026 B1
DATED         : August 27, 2002
INVENTOR(S)   : Douglas Rene Johnson et al.

It is certified that error appears in the above-identified patent and that said Letters Patent is hereby corrected as shown below:

<u>Column 6,</u>
Line 14, "gears" should be -- gear --.
Line 30, "couple" should be -- coupled --.

Signed and Sealed this

Twenty-second Day of April, 2003

JAMES E. ROGAN
*Director of the United States Patent and Trademark Office*